United States Patent
Erdogan et al.

(10) Patent No.: US 10,120,902 B2
(45) Date of Patent: Nov. 6, 2018

(54) APPARATUS AND METHOD FOR PROCESSING DISTRIBUTED RELATIONAL ALGEBRA OPERATORS IN A DISTRIBUTED DATABASE

(71) Applicant: Citus Data Bilgi Islemleri Ticaret A.S., Istanbul (TR)

(72) Inventors: Ozgun Erdogan, San Francisco, CA (US); Sumedh Pathak, Istanbul (TR); Hadi Moshayedi, Istanbul (TR); Metin Doslu, Istanbul (TR)

(73) Assignee: Citus Data Bilgi Islemleri Ticaret A.S., Istanbul (TR)

( * ) Notice: Subject to any disclaimer, the term of this patent is extended or adjusted under 35 U.S.C. 154(b) by 578 days.

(21) Appl. No.: 14/185,802

(22) Filed: Feb. 20, 2014

(65) Prior Publication Data
US 2015/0234895 A1    Aug. 20, 2015

(51) Int. Cl.
    *G06F 17/30* (2006.01)
(52) U.S. Cl.
    CPC .............. *G06F 17/30466* (2013.01)
(58) Field of Classification Search
    None
    See application file for complete search history.

(56) References Cited

U.S. PATENT DOCUMENTS

| | | |
|---|---|---|
| 5,598,559 A | 1/1997 | Chaudhuri |
| 6,112,198 A | 8/2000 | Lohman et al. |
| 8,316,060 B1 * | 11/2012 | Snyder, II ......... G06F 17/30958 707/797 |
| 2011/0161310 A1 * | 6/2011 | Tang ................. G06F 17/30463 707/714 |
| 2012/0239641 A1 * | 9/2012 | Narayanan .............. G06F 12/08 707/713 |
| 2012/0317094 A1 * | 12/2012 | Bear ................. G06F 17/30463 707/714 |
| 2014/0101205 A1 * | 4/2014 | Idicula ............. G06F 17/30498 707/803 |

(Continued)

OTHER PUBLICATIONS

Kossmann, Donalo, "The State of the Art in Distributed Query Processing", ACM Computing Surveys, ACM, New York, NY, vol. 32, No. 4, Dec. 1, 2000, pp. 422-469

(Continued)

*Primary Examiner* — Christopher J Raab
(74) *Attorney, Agent, or Firm* — Cooley LLP

(57) ABSTRACT

A database system includes a query planner with instructions executed by a processor to generate a logical plan tree. Each node of the logical plan tree is a distributed relational algebra operator. Each child node of the logical plan tree produces results processed by a parent node. The logical plan tree includes a distributed relational operator that reparations tuples of results that are at least 1 GB on a dimension and regroups the tuples on the dimension to avoid broadcasting the tuples between machines and thereby avoid consumption of network bandwidth associated with broadcasting the tuples. The logical plan tree is modified according to algebraic transformation rules. The logical plan tree is mapped to distributed query execution primitives. The distributed query execution primitives are processed on machines storing partitions of a distributed database table.

25 Claims, 9 Drawing Sheets

(56) References Cited

U.S. PATENT DOCUMENTS

2014/0164422 A1* 6/2014 Diaz ................ G06F 17/30566
  707/760
2014/0365533 A1* 12/2014 Debray ............ G06F 17/30474
  707/803

OTHER PUBLICATIONS

International Search Report and Written Opinion issued to international patent application No. PCT/TR2015/000058, dated Jun. 26, 2015, 11 pgs.
Stone, Paul, et al., "Review of Relational Algebra for Query Processing in Dynamic Distributed Federated Databases", Sep. 30, 2010, 7 pgs. retrieved from the internet: https://www.usukita.org/papers/6027/TA3_21_Stone_review_of_relational.pdf
Ceri et al., "Correctness of Query Execution Strategies in Distributed Databases", ACM Transactions on Database Systems, vol. 8, No. 4, Dec. 1983, pp. 577-607.

\* cited by examiner

- Select
    sum (l.extendedprice * l.discount)
  From lineitem ... → distributed large table
  Where
    l_shipdate >= date '1994-01-01' And
    l_shipdate < date '1994-01-01' + interval '1' year And
    l_discount Between 0.06-0.01 And 0.06 + 0.01 And
    l-quantity < 24;
Fig. 3A
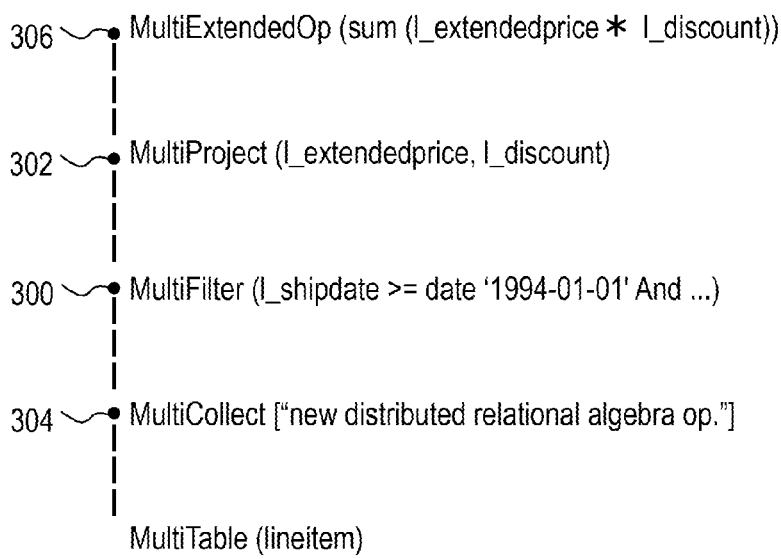
Fig. 3B
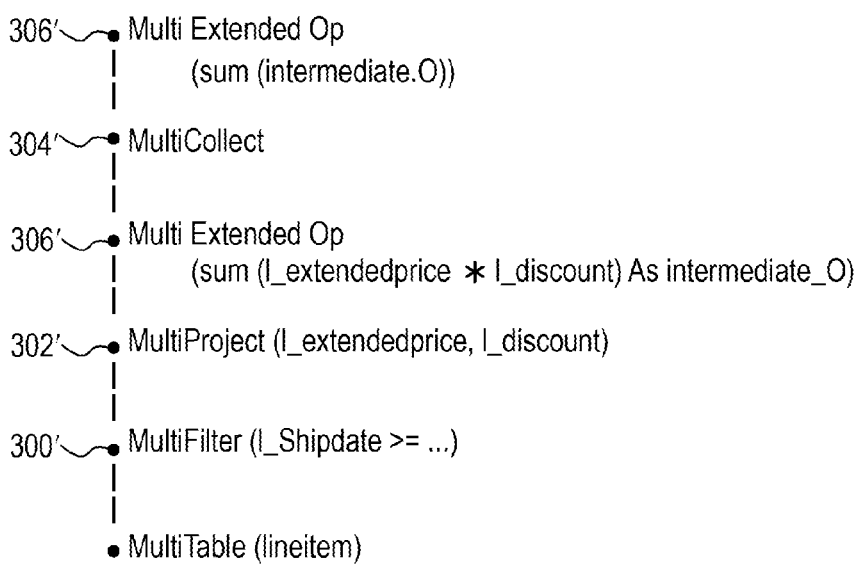
Fig. 3C

| Select | l_orderkey, sum (l_extendedprice * (l-l_discount)) as revenue, o_orderdate, o_shippriority |
|---|---|
| From | customer, orders, lineitem |
| Where | c_custkey = o_custkey And |
| | l_orderkey = o_orderkey And |
| | c_mktsegment = 'BUILDING' And |
| | o_orderdate < date '1995-03-15' And |
| | l_shipdate > date '1995-03-15' |
| Group By | l_orderkey, orderdate, o_shippriority; |

Select   100 ∗ sum (case when p-type like 'PROMO%' then l_extendedprice ∗ (l-l_discount)
                else 0 end) /
         sum (l_extendedprice ∗ (l-l_discount)) as promo-revenue
From     lineitem, part
Where    l_partkey = p_partkey And
         l_shipdate >= date '1995-09-01' And
         l_shipdate < date '1995-09-01 + interval '1 month' ;

- $map_1$ also performs a colocated join between lineitem $_a$ and orders $_a$ shards where a represents the same interval of values (for the partition key)

- $map_1$, $map_2$, ... $SQL_{13}$ are different tasks that form our physical plan tree.

APPARATUS AND METHOD FOR PROCESSING DISTRIBUTED RELATIONAL ALGEBRA OPERATORS IN A DISTRIBUTED DATABASE

FIELD OF THE INVENTION

This invention relates generally to software based data storage and retrieval. More particularly, this invention relates to techniques for operating a distributed database utilizing distributed relational algebra operators.

BACKGROUND OF THE INVENTION

A distributed database is a database in which partitions of data are distributed across discrete computational resources. The distributed database may be implemented in multiple computers located in the same physical location, or may be dispersed over a network of interconnected computers. A distributed database can reside on network servers on the Internet, on corporate intranets or extranets, or on other networks.

There are ongoing needs to improve processing in distributed databases. In particular, it is desirable to reduce the amount of data that needs to be transmitted across a network.

SUMMARY OF THE INVENTION

A database system includes a query planner with instructions executed by a processor to generate a logical plan tree. Each node of the logical plan tree is a distributed relational algebra operator. Each child node of the logical plan tree produces results processed by a parent node. The logical plan tree includes a distributed relational operator that reparations tuples of results that are at least 1 GB on a dimension and regroups the tuples on the dimension to avoid broadcasting the tuples between machines and thereby avoid consumption of network bandwidth associated with broadcasting the tuples. The logical plan tree is modified according to algebraic transformation rules. The logical plan tree is mapped to distributed query execution primitives. The distributed query execution primitives are processed on machines storing partitions of a distributed database table.

BRIEF DESCRIPTION OF THE FIGURES

The invention is more fully appreciated in connection with the following detailed description taken in conjunction with the accompanying drawings, in which:

FIGS. 3A, 3B and 3C respectively illustrate a sample query, an original logical query execution plan and a modified logical query execution plan configured in accordance with an embodiment of the invention.

Like reference numerals refer to corresponding parts throughout the several views of the drawings.

DETAILED DESCRIPTION OF THE INVENTION

Figure 1:
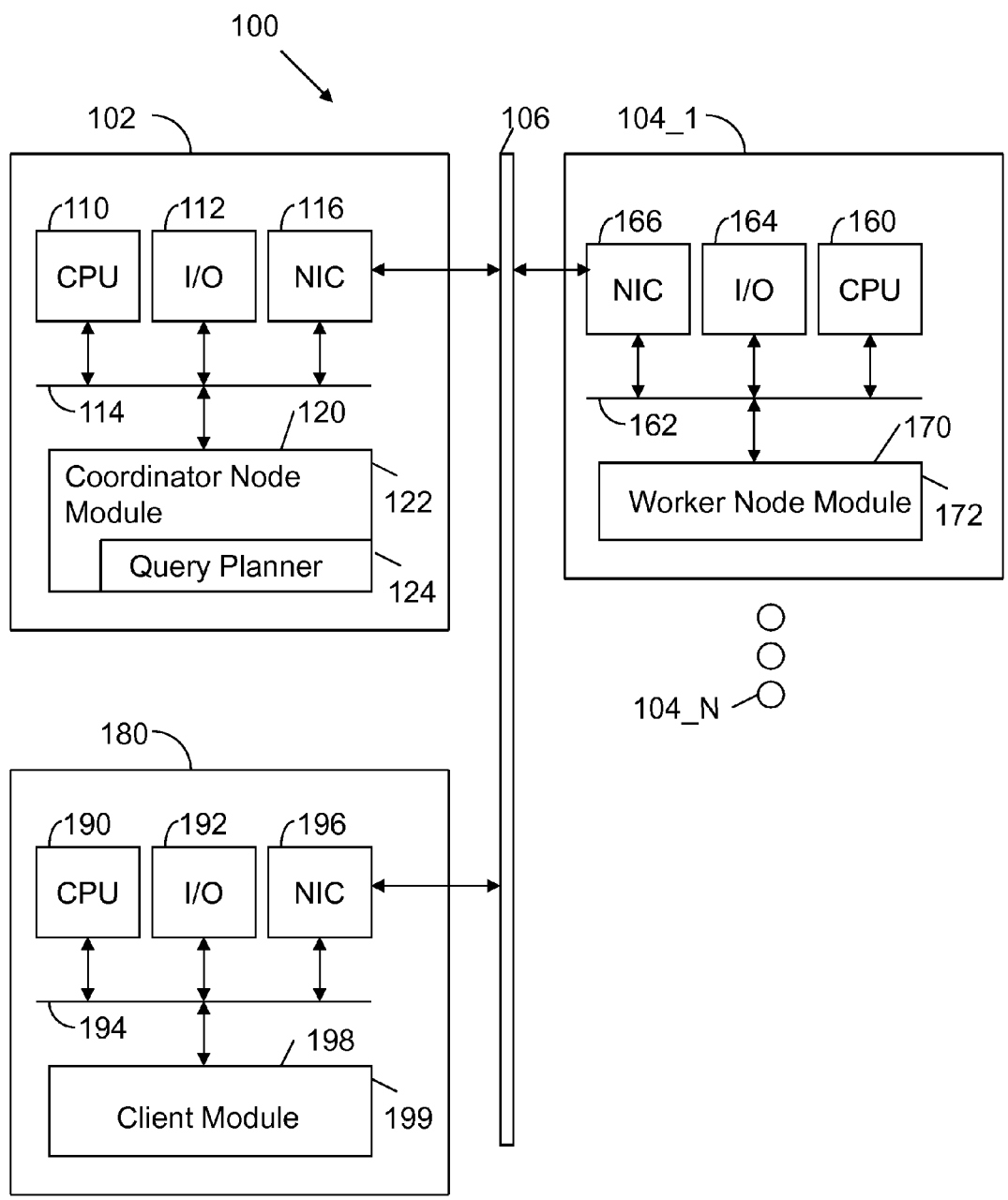
FIG. 1 illustrates a system configured in accordance with an embodiment of the invention.

FIG. 1 illustrates a system 100 configured in accordance with an embodiment of the invention. The system 100 includes a coordinator node 102 and a set of worker nodes 104_1 through 104_N that implement a distributed database. The coordinator node 102 may be a master node or may be attached to a master node (not shown). A wired or wireless network connection 106 links the coordinator node 102 and the worker nodes 104.

The coordinator node 102 includes standard components, such as a central processing unit 110 connected to a set of input/output devices 112 via a bus 114. The input/output devices 112 may include a keyboard, mouse, display, printer and the like. A network interface circuit (NIC) 116 is also connected to the bus 114 and provides access to the worker nodes 104 through network connection 106. A memory 120 is also connected to the bus 114. The memory 120 stores executable instructions to implement disclosed operations. In particular, the memory stores a coordinator node module 122, which includes executable instructions to implement the distributed database operations disclosed below. In one embodiment, the coordinator node module 122 includes a query planner 124, as discussed below. The coordinator node module 122 may also include metadata about the data in the cluster. This metadata may be synchronously or asynchronously replicated to other nodes in the cluster for scalability or fault tolerance purposes.

Each worker node 104 also includes standard components, such as a central processing unit 160, a bus 162, input/output devices 164 and a network interface circuit 166. Each worker node computer 104 also includes a memory 170 with executable instructions in the form of a worker node module 172. The worker node module 172 includes executable instructions that are responsive to commands from the coordinator node module 122. Such commands relate to storage, access, replication and duplication of distributed database partitions, as discussed below. Additional commands relate to querying distributed database partitions to derive insights from the data.

The system 100 may also include one or more client computers 180. Each client computer 180 has an associated user of the distributed database. The client computer 180 also includes standard components, such as a central processing unit 190, a bus 194, input/output devices 192 and a network interface circuit 196. Each client computer 180 also includes a memory 198 with executable instructions in the form of a client module 199. The client module 199 may be a browser used to access the distributed database. Alternately, the client module 199 may be a dedicated application for interacting with the distributed database. This dedicated application may communicate with the distributed database through standard protocols such as Structured Query Language (SQL), Open Database Connectivity (ODBC) and Java-based Database Connectivity (JDBC). Finally, the client module 199 may be executed on worker nodes 104 to reduce the cost of data transfers during data upload operations.

Although system 100 includes many attributes associated with known distributed database configurations, the system 100 fundamentally departs from prior art distributed database configurations through its conceptualization of modular data blocks. Each modular data block holds a segment of data associated with the distributed database. The coordinator node 102 defines the modular data blocks and manages their distribution to various worker nodes 104. Each modular data block has a size of 5 Gigabytes or less. This stands in contrast to prior art distributed databases, which partition the data into worker nodes and therefore do not impose a hard limit on the database partition size. As a result, prior art systems have distributed database partitions that range in size from around 100 Gigabytes to around 10,000 Gigabytes. Further, in the prior art, a single worker node holds a single partition of data from the distributed database. In contrast, with the present invention, each worker node 104 holds 25 or more modular data blocks of partitioned data.

A partition is a division of a logical database into distinct independent parts. Each partition may be spread over multiple nodes. Users at a local node can perform local transactions on the partition. The disclosed modular data block is a partition, but the term modular data block is used to emphasize the size distinction compared to prior art implementations of distributed databases. This configuration has advantages in the event of a resource failure and when resources are added to the system. Further, the modular data blocks may be split or merged, or they may be rebalanced across the worker nodes in the system. The modular data blocks may have a schema that defines the underlying data, or the schema may be projected on to the data at read query time. The defined or projected schema may then be dynamically changed across the modular data blocks. These advantages are set forth in the following commonly owned patent applications: Ser. No. 13/345,620; Ser. No. 13/345,621; Ser. No. 13/345,625; and Ser. No. 13/345,626, each of which was filed on Jan. 6, 2012 and each of which is incorporated herein by reference.

Further, the modular data blocks may have data in semi-structured formats. These data blocks may be associated with foreign table declarations specifying conversions of the data in the semi-structured formats into tabular formats interpretable by a query language. A distributed query plan may be produced in response to a query language query. The distributed query plan may include sub-queries. The sub-queries may be directed to selected worker nodes of the networked worker nodes and executed at the selected worker nodes. The execution includes using the foreign table declarations to convert data in semi-structured formats into tabular formats to produce tabular data responsive to the query language query. The tabular data may then be merged to produce a query result.

The semi-structured data mentioned here might be stored in plain-text format, such as JSON, or a binary format that represents the data more efficiently. Further, the foreign data wrapper could directly process this data at query time, or it could be converted into a tabular format and cached in memory or on-disk. The cached data may then be referenced across different queries.

Figure 2:
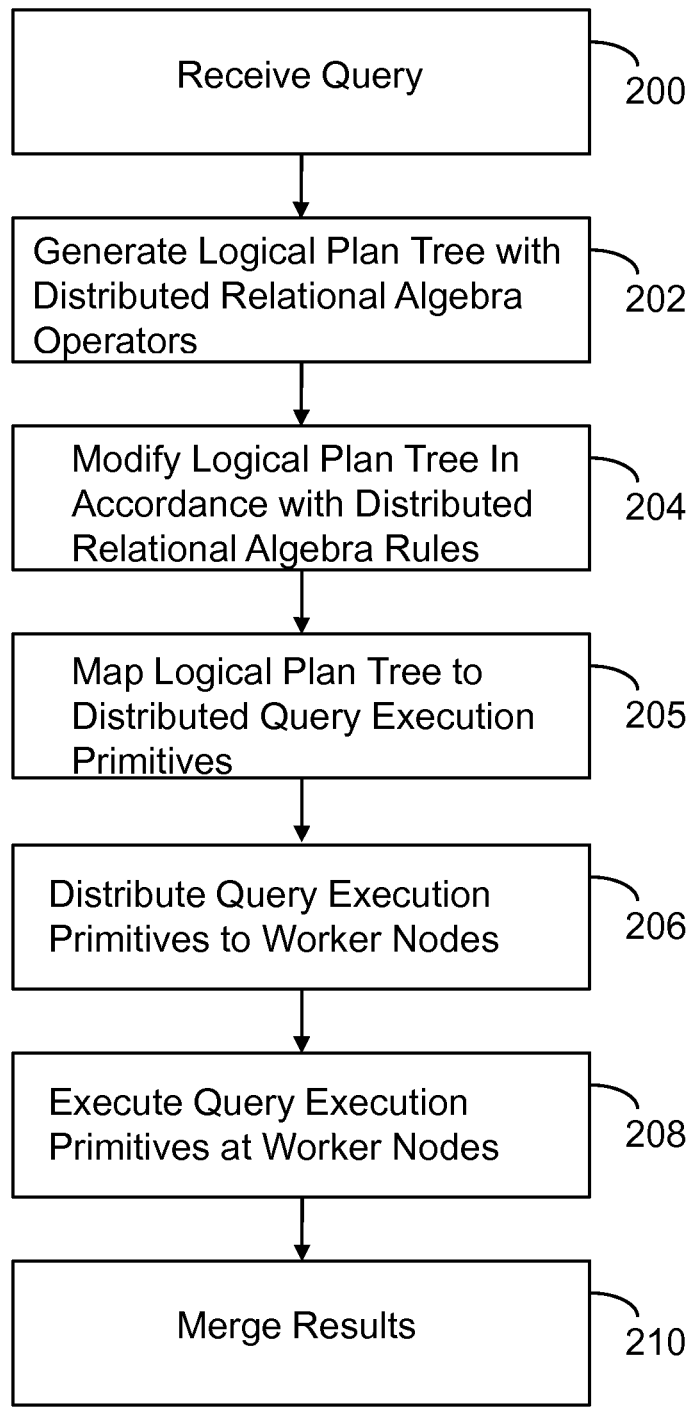
FIG. 2 illustrates processing operations associated with an embodiment of the invention.

The system 100 also departs from prior art distributed database configurations through its utilization of distributed relational algebra operators. FIG. 2 illustrates processing operations performed in accordance with an embodiment of the invention. Initially, a query is received 200. For example, a query from the client device 180 may be received at the coordinator node 122. The query planner 124 generates a logical plan tree with distributed relational algebra operators 202. Each node of the logical plan tree is a distributed relational algebra operator. The logical plan tree is modified in accordance with distributed relational algebra rules 204.

This modification may also be viewed as creating a new logical plan tree from the original plan tree, and then applying changes on the new logical plan tree. For example, the original logical plan tree may be modified to produce a second logical plan tree by splitting a distributed extended relational algebra operator into a first new distributed extended relational algebra operator located at a position in the second logical plan tree corresponding to the position of the distributed extended relational algebra operator in the original logical plan and a second new distributed extended relational extended relational algebra operator located beneath the first new distributed extended relational algebra operator in the second logical plan tree. Alternately, if a first distributed relational algebra operator of an original logical plan tree has a child that is unary and if the first distributed relational algebra operator is commutative with the child then the first distributed relational algebra operator is dropped to a position lower in a second logical plan tree than the position of the first distributed relational algebra operator in the first logical plan tree. If the first distributed relational algebra operator has binary children and if the first relational algebra operator is distributive with the binary children, the first distributed relational algebra operator is dropped to a position lower in the second logical plan tree than the position of the first relational algebra operator in the original logical plan tree. In another embodiment, the logical plan tree includes a distributed relational operator that reparations tuples of results that are at least 1 GB on a dimension and regroups the tuples on the dimension to avoid broadcasting the tuples between machines and thereby avoid consumption of network bandwidth associated with broadcasting the tuples. Examples of such operations and the rules governing such operations are provided below.

Once the logical plan tree is finalized, the plan tree is mapped to distributed query execution primitives 205. These query execution primitives are distributed to worker nodes 206. The query execution primitives are executed at the worker nodes 208. The results are then merged 210, typically at the coordinator node module 122. It is also worth noting that after receiving the query 200, the database may choose to apply other steps. For example, the database may determine a join strategy for a query before 210. This join strategy may involve choosing a join order and join method between different tables in the query.

Each node of a logical plan tree is a distributed relational algebra operator. Each child node of the logical plan tree produces results processed by a parent node. In accordance with the invention, parent and child nodes may be repositioned to obtain processing efficiencies. Repositioning of nodes is governed by algebraic principles. Algebra, in general, comprises operators and atomic operands. For instance, in the algebra of arithmetic, the atomic operands are variables like x and constants like 15. The operators are the usual arithmetic operators: addition, subtraction, multiplication, and division. Any algebra allows one to build expressions by applying operators to atomic operands or other expressions of the algebra.

Relational algebra is another example of algebra. Its atomic operands are: (1) variables that stand for relations, and (2) constants, which are finite relations. In relational algebra, all operands and the results of expressions are sets or bags (bags are multi-sets that allow for duplicate tuples). The operations of the traditional relational algebra fall into four broad classes:

1. The usual set operations—union, intersection, and difference—applied to relations.

2. Operations that remove parts of a relation: "filter" eliminates some rows (tuples), and "projection" eliminates some columns.
3. Operations that combine the tuples of two relations, including "Cartesian product," which pairs the tuples of two relations in all possible ways, and various kinds of "join" operations, which selectively pair tuples from two relations.
4. An operation called "renaming" that does not affect the tuples of a relation, but changes the relation schema, i.e., the names of the attributes or the name of the relation itself.

Assuming that R and S are arbitrary sets, below are formal definitions for operators in the traditional relational algebra.

R∪S: the union of R and S is the set of elements that are in R or S or both. An element appears only once in the union even if it is present in both R and S.

R∩S: the intersection of R and S is the set of elements that are in both R and S.

R−S: the difference of R and S, is the set of elements that are in R but not in S. Note that R−S is different from S−R; the latter is the set of elements that are in S but not in R. Union, intersection, and difference operators are binary operators.

The projection operator is used to produce from a relation R a new relation that has only some of R's columns. The value of expression $\pi_{A_1, A_2, \ldots, A_n}(R)$ is a relation that has only the columns for attributes $A_1, A_2, \ldots, A_n$, of R. The schema for the resulting value is the set of attributes $(A_1, A_2, \ldots, A_n)$, which are conventionally shown in the order listed. Projection is a unary operator.

The filter operator, applied to a relation R, produces a new relation with a subset of R's tuples. The tuples in the resulting relation are those that satisfy some condition C that involves the attributes of R. We denote this $\sigma_c(R)$. The schema for the resulting relation is the same as R's schema, and we conventionally show the attributes in the same order as we use for R.

C is a conditional expression of the type used in conventional programming languages; for example, conditional expressions follow the keyword if in programming languages such as Ruby or Java. The only difference is that the operands in condition C are either constants or attributes of R. We apply C to each tuple t of R by substituting, for each attribute A appearing in condition C, the component of t for attribute A. If after substituting for each attribute of C the condition C is true, then t is one of the tuples that appear in the result of $\sigma_c(R)$; otherwise t is not in the result. Filter is a unary operator.

The Cartesian product (or cross-product, or just product) of two sets R and S is the set of pairs that can be formed by choosing the first element of the pair to be any element of R and the second any element of S. This product is denoted R×S. When R and S are relations, the product is essentially the same. However, since the members of R and S are tuples, usually consisting of more than one component, the result of pairing a tuple from R with a tuple from S is a longer tuple, with one component for each of the components of the constituent tuples. By convention, the components from R precede the components from S in the attribute order for the result. Cartesian product is a binary operator.

We may also want to take the product of two relations by pairing only those tuples that match in some way. The simplest sort of match is the natural join of two relations R and S, denoted R⋈S, in which we pair only those tuples from R and S that agree in whatever attributes are common to the schemas of R and S. More precisely, let $A_1, A_2, \ldots, A_n$ be all the attributes that are in both the schema of R and the schema of S. Then a tuple r from R and a tuple s from S are successfully paired if and only if r and s agree on each of the attributes $A_1, A_2, \ldots, A_n$.

If the tuples r and s are successfully paired in the join R⋈S, then the result of the pairing is a tuple, called the joined tuple, with one component for each of the attributes in the union of the schemas of R and S. The joined tuple agrees with tuple r in each attribute in the schema of R, and it agrees with s in each attribute in the schema of S. Since r and s are successfully paired, the joined tuple is able to agree with both these tuples on the attributes they have in common. It's also worth noting that join operators may define operations besides a natural join. Some of these variations include semi-join, theta join, left outer join, right outer join, full outer join, and aggregate functions within join operators. Join is a binary operator.

Relational algebra, like all algebra, allows one to form expressions of arbitrary complexity by applying operators either to given relations or to relations that are the result of applying one or more relational operators to relations. One can construct expressions of relational algebra by applying operators to sub-expressions, and using parentheses when necessary to indicate groupings of operands. It is also possible to represent expressions as expression trees.

Besides the ones described above, other relational algebra operators such as the ones described below may exist. We refer to these as extended relational algebra operators:

The duplicate elimination operator δ turns a bag into a set by eliminating all but one copy of each tuple.

Aggregation operators, such as sums, counts, mins, maxes, or averages, are not operations of relational algebra. but are used by the grouping operator (described next). Aggregation operators apply to attributes (columns) of a relation. For example, the sum of a column produces the one number that is the sum of all the values in that column.

Grouping of tuples according to their value in one or more attributes has the effect of partitioning the tuples of a relation into "groups." Aggregation can then be applied to columns within each group, giving one the ability to express a number of queries that are impossible to express in the classical relational algebra. The grouping operator γ is an operator that combines the effect of grouping and aggregation.

The sorting operator τ turns a relation into a list of tuples, sorted according to one or more attributes. This operator should be used judiciously, because other relational algebra operators apply to sets or bags, but never to lists. Therefore, τ only makes sense as the final step of a series of operations.

Extended projections give additional power to the operator π. In addition to projecting out some columns, in its generalized form π can perform computations involving the columns of its argument relation to produce new columns.

The invention utilizes algebraic transformation rules, such as the commutative property, the associative property, the distributive property and the idempotence property. These algebraic transformation rules may be used in optimizing distributed query plans.

The commutative property specifies that a binary operation is commutative if changing the order of the operands does not change the result. In formal terms, a binary operation * on a set S is called commutative if:

$x*y=y*x$ for all $x,y \in S$

As examples, addition and multiplication operators in simple arithmetic are commutative (5+7=7+5). By contrast, subtraction and division operators are not commutative. (5−7≠7−5).

The associative property is a property of some binary operations. Within an expression containing two or more occurrences in a row of the same associative operator, the order in which the operations are performed does not matter as long as the sequence of the operands is not changed. That is, rearranging the parentheses in such an expression will not change its value. Formally, a binary operation * on a set S is called associative if:

$(x*y)*z=x*(y*z)$ for all $x,y,z \in S$

As an example, addition and multiplication of real numbers are associative. In string operations, concatenation of three strings "hello", "my", "world" is associative. As a comparison, the same string concatenation operator is not commutative.

In abstract algebra and logic, the distributive property of binary operations generalizes the distributive law from elementary algebra. In propositional logic, distribution refers to two valid rules of replacement. The rules allow one to reformulate conjunctions and disjunctions within logical proofs. Formally, given a set S and two binary operators * and +, we say the operation * is left-distributive over + if, given any elements x, y, and z of S, $x*(y+z)=(x*y)+(x*z)$ is right-distributive over + if, given any elements x, y, and z of S, $(y+z)*x=(y*x)+(z*x)$ is distributive over + if it is left- and right-distributive.

Notice that when * is commutative, then the three above conditions are logically equivalent.

As an example, multiplication of numbers is distributive over addition of numbers, for a broad class of different kind of numbers ranging from natural numbers to complex numbers and cardinal numbers.

Idempotence is the property of certain operations in mathematics and computer science, which can be applied multiple times without changing the result beyond the initial application. The concept of idempotence arises in a number of places in abstract algebra functional programming.

There are several meanings of idempotence, depending on what the concept is applied to:

A unary operation (or function) is idempotent if, whenever it is applied twice to any value, it gives the same result as if it were applied once; i.e., $f(f(x))\equiv f(x)$. For example, the absolute value: $abs(abs(x)) \equiv abs(x)$.

A binary operation is idempotent if, whenever it is applied to two equal values, it gives that value as the result. For example, the operation giving the maximum value of two values is idempotent: $\max(x, x) \equiv x$.

Given a binary operation, an idempotent element (or simply an idempotent) for the operation is a value for which the operation, when given that value for both of its operands, gives the value as the result. For example, the number 1 is an idempotent of multiplication: $1 \times 1 = 1$.

Formally, given a binary operation on a set S, an element x is said to be idempotent if:

x x=x. For example, the operations of set union and set intersection are both idempotent.

The following tables and theorems show the applicability of these rules for distributed relational algebra operators. In these tables, we use the following shorthand notations: PRJ for the projection operator, MSL for the filter operator, PAR for the repartition operator, COL for the collect operator, MCP for the Cartesian Product operator, MUN for the union operator, DIF for the difference operator, and MJN for the join operator. Note that these tables and theorems also indicate special conditions (SC) that apply for the algebraic transformation rule to hold.

TABLE I

Commutativity of Unary Operations: UN1(UN2(R)) UN2(UN1(R))

| $UN_1$ \ $UN_2$ | PRJ | PAR | COL | QSL | MSL |
|---|---|---|---|---|---|
| PRJ | $SNC_1$ | $SNC_2$ | Y | Y | $SNC_3$ |
| PAR | Y | Y | N | $SNC_4$ | Y |
| COL | Y | N | Y | N | Y |
| QSL | Y | $SNC_4$ | N | Y | $SNC_5$ |
| MSL | Y | Y | Y | $SNC_5$ | Y |

Conditions:

$SNC_1$: $PRJ[A_1](PRJ[A_2](R)) \rightarrow PRJ[A_2](PRJ[A_1](R))$ iff $A_1=A_2$ $SNC_2$: $PRJ[A](PAR[P](R)) \rightarrow PAR[P](PRJ[A](R))$ iff ❉ $p \in P$, $A(p) \subseteq A$ $SNC_3$: $PRJ[A](MSL[p](R)) \rightarrow MSL[p](PRJ[A](R))$ iff $A(p) \subseteq A$ $SNC_4$: $PAR[P](QSL[p](R)) <-> QSL[p][(PAR[P](R))$ iff ❉ $p_1 \in P$ $(p \Rightarrow p_1)$ $SNC_5$: $MSL[p_1](QSL[p_2](R)) <-> QSL[p_2](MSL[p_1](R))$ iff $p_2 \dashv p_1$

TABLE II

Distributivity of Unary Operations with Respect to Binary Operations

| | | MCP | MUN | DIF | MJN[jp] | SJN[jp] |
|---|---|---|---|---|---|---|
| PRJ | PRJ[A](BIN(R, S)) → BIN(PRJ[$A_R$](R), PRJ[$A_s$](S))) | Y $A_R = A - A(S)$ $A_s = A - A(R)$ | Y $A_R = A_S = A$ | N | $NSC_1$ $A_R = A - A(S)$ $A_S = A - A(R)$ | $NSC_1$ $A_R = A - A(S)$ $A_S = A - A(R)$ |
| PAR | PAR[P](BIN(R, S)) → BIN(PAR[$P_R$](R), PAR[$P_s$](S)) | $NSC_2$ $P_R = \bar{p}$, $P_S = \bar{p}$ | Y $P_R = P$, $P_S = P$ | Y $P_R = P$, any $P_S$ | $NSC_2$ $P_R = \bar{p}$, $P_S = \bar{p}$ | Y $P_R = P$, $P_S = \{true\}$ |
| COL | COL(BIN(R, S)) → BIN(COL(R), COL(S)) | Y | N | Y | Y | Y |
| QSL | QSL[p](BIN(R, S)) → | N | Y | Y | N | N |

TABLE II-continued

Distributivity of Unary Operations with Respect to Binary Operations

|  |  | MCP | MUN | DIF | MJN[jp] | SJN[jp] |
|---|---|---|---|---|---|---|
|  | BIN(QSL[$p_r$](R),QSL[$p_s$](S)) |  | $p_r = p_s = p$ | $p_r = p$ |  |  |
|  |  |  |  | $p_s$ = true |  |  |
| MSL | MSL[p](BIN(R, S)) → | $NSC_3$ | Y | Y | $NSC_3$ | $NSC_3$ |
|  | BIN(MSL[$p_r$](R), MSL[$p_s$](S)) | $p_r = p_1$ | $p_r = p_s = p$ | $p_r = p$ | $p_r = p_1$ | $p_r = p_1$ |
|  |  | $p_s = p_2$ |  | $p_s$ = true | $p_s = p_2$ | $p_s = p_2$ |

Conditions:

$NSC_1$: $A(jp)[A$ $NSC_2$: $\exists \overline{p}, \overline{p}: \{p_{rs} = p_r \wedge p_s, \text{❋} <p_r, p_s> \in \overline{p} x \overline{p}\} = p$ and $A(p_r) \subseteq A(R), A(p_s) \subseteq A(S), \text{❋} p_r \varepsilon \overline{p}, \text{❋} p_s \varepsilon \overline{p}$ $NSC_3$: $\exists p_1, p_2 : p = p_1 \wedge p_2$ $A(p_1) \subseteq A(R), A(p_2) \subseteq A(S)$ Idempower of Unary Operations Theorem 1. The validity indicators for idempower of unary operations of MRA are the following.

| | |
|---|---|
| PRJ[A] ® ↔ PRJ[A](PRJ[$A_1$](R)) | SNC: A ⊆ $A_1$ |
| QSL[p](R) ↔ QSL[p](QSL[$p_1$](R)) | SNC: p ⇔ $p_1$ |
| MSL[p](R) ↔ MSL[$p_1$](MSL[$p_2$](R)) | SNC: p = $p_1 \wedge p_2$ |
| COL(R) ↔ COL(COL(R)) | Y |
| PAR[P](R) ↔ PAR[$P_1$](PAR[$P_2$](R)) | SNC: P = {$p_1 \wedge p_2$: $p_1 \in P_1, p_2 \in P_2$}. |

Associativity of Binary Operations

Theorem 2. The validity indicators for associativity of binary operations of MRA are the following.

| | |
|---|---|
| MUN(R, MUN(S, U)) ↔ MUN(MUN(R, S), U) | Y |
| MCP(R, MCP(S, U)) ↔ MCP(MCP(R, S), U) | Y |
| DIF(R, DIF(S, U)) ↔ DIF(DIF(R, S), U) | N |
| MJN[$jp_1$](R, MJN[$jp_2$](S, U)) → MJN[$jp_2$](MJN[$jp_1$](R, S), U) | $SNC_1$ |
| SJN[$jp_1$](R, SJN[$jp_2$](S, U)) ↔ SJN[$jp_2$](SJN[$jp_1$](R, S), U) | N |
| $SNC_1$: A($jp_1$) ⊆ A(R) ∪ A(S) | |

The foregoing is more fully appreciated in connection with some examples. FIG. 3A illustrates a sample query. FIG. 3B illustrates an original query plan. Relational algebra operators are prefixed with "multi" to indicate that they execute on multiple database table partitions. "ExtendedOp" does not originally exist in relational algebra, but it is added here to express operations such as aggregate functions (e.g., sum, average, etc.), group bys, order bys and so forth. MultiTable (lineitem) is a partitioned table that is read. MultiCollect collects all the partitions into a single machine. MultiProject eliminates some of the columns (by specifying columns to keep).

Dashed lines represent where computations are executed locally; solid lines represent data getting transferred across the network. The plan of FIG. 3B pulls all of the data across the network to a single worker node where it is executed. While the plan is logically correct, it is very inefficient.

FIG. 3C is an optimized plan. The aggregate function "sum" is spit into two to convert the aggregate function into a distributedly computable form. The split sum is pushed to the distributed table. The MultiFilter operator 300 of FIG. 3B is pushed down as MultiFilter operator 300' in FIG. 3C. Thus, filtering is performed at individual worker nodes before any data is collected across the network. This is possible because a filter operator is commutative with a collect operator. Similarly, the MultiProject operator 302 of FIG. 3B is pushed down as MultiProject operator 302' in FIG. 3C. The MultiCollect operator 304 of FIG. 3B is pulled up as MultiCollect operator 304' of FIG. 3C. The MultiExtendedOp 306 of FIG. 3B is split into two operations 306' of FIG. 3C: sum at worker nodes and then sum at collection. These optimizations ensure that the underlying data is filtered, projected, and summed up on the worker nodes before being transferred across the network. As a result, very little data is transferred across the network. Observe that collect and repartition concepts do not exist in relational algebra because there are no issues with moving data. Data movement considerations are used herein to ascribe distributed relational algebra concepts to collect and repartition operations.

Figures 6A, 6B:
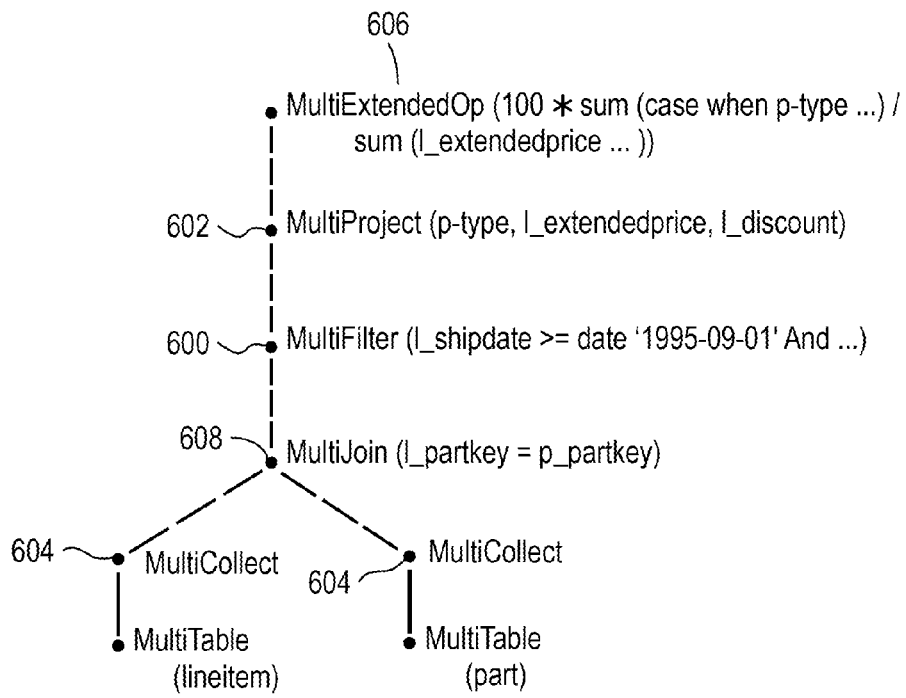
FIGS. 6A, 6B and 6C respectively illustrate a sample query, an original logical query execution plan and a modified logical query execution plan configured in accordance with an embodiment of the invention.

FIG. 6A illustrates a query in which one large table is joined with one small table. FIG. 6B illustrates an original logical query plan tree with MultiCollect operations 604 relatively low in the logical query plan tree, meaning that data is shuffled across the network at the beginning of processing. In contrast, in the optimized logical query plan tree of FIG. 6C the MultiCollect operation 604' is once again near the top of the logical query plan tree, resulting in reduced data movement across the network.

Figure 6C:
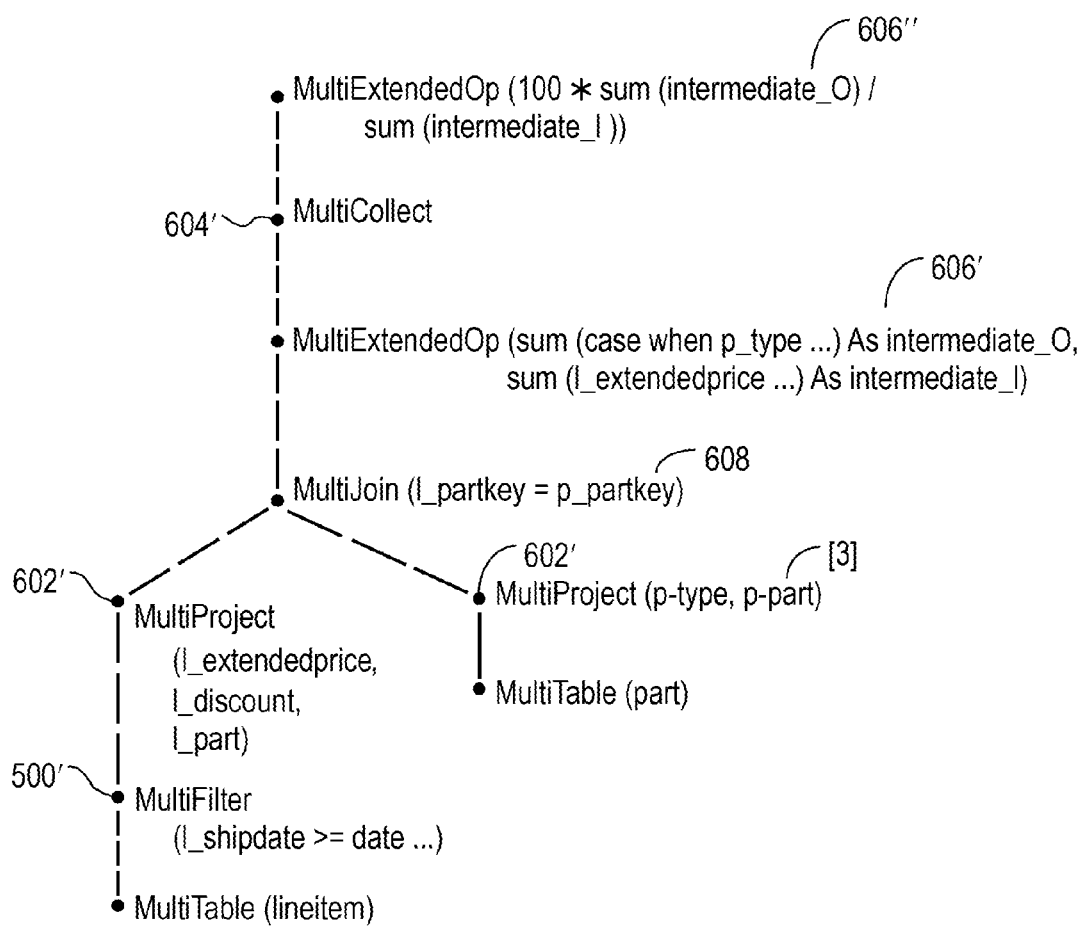

The MultiProject 602 and MultiFilter 600 operations of FIG. 6B are relatively high in the logical query plan tree, whereas in the optimized version of FIG. 6C the MultiProject 602' and MultiFilter 600' operations are pushed relatively low in the logical query plan tree. Since it is desirable to push a filter operator down the logical query plan tree, the filter operator needs to be distributive with a binary join operator.

There are multiple ways to implement a join. Since there is a large table (lineitem) and a small table (part), one can broadcast the small table to all nodes in the system and then perform the join, as a broadcast join. Note that the query planner may differentiate between large and small tables using different criteria. For example, if the table exceeds a predefined table size or block count, the query planner may consider it as large. Also, the query planner may choose to apply partition and join pruning before comparing the table size or block count against the predefined values. Further, the query planner may use statistics about the underlying data and relational algebra operators applied prior to a join operator to determine the estimated size, and then compare the size against predefined values. Finally, the query planner may choose to use dynamic values instead of predefined ones to determine that a table is large.

The MultiExtendedOp operator 606 of FIG. 6B is split into two MultiExtendedOp operators 606' and 606" in FIG. 6C to make the aggregate functions distributedly computable. Further, the expression in 606″ is recursed over and has been split into two separate expressions in 606′. This is because the original expression contains a division and division is not commutative. Therefore, the original expression is transformed into a commutative form to generate two intermediate results.

When pushing down the MultiProject operator 602′ below the MultiJoin operator 608 the MultiProject operator 602′ picks up the columns in the join clause (l_partkey and p_partkey). This is because the MultiProject operator 602′ is distributive with the MultiJoin operator 608 through special conditions; and these special conditions require the columns in the join clause to be included in the MultiProject operator during a push down.

The MultiJoin operator 608 in each figure is the same. The MultiJoin operator does not require excessive data transfers in this figure because the part table is small enough to be broadcast to all worker nodes in the cluster. This way all shards in the part table can be co-located with the shards in the lineitem table. Further, once shard(s) for the part table has been broadcast to all the worker nodes, it can be cached on these nodes and only updated as the underlying table changes.

Figure 5:
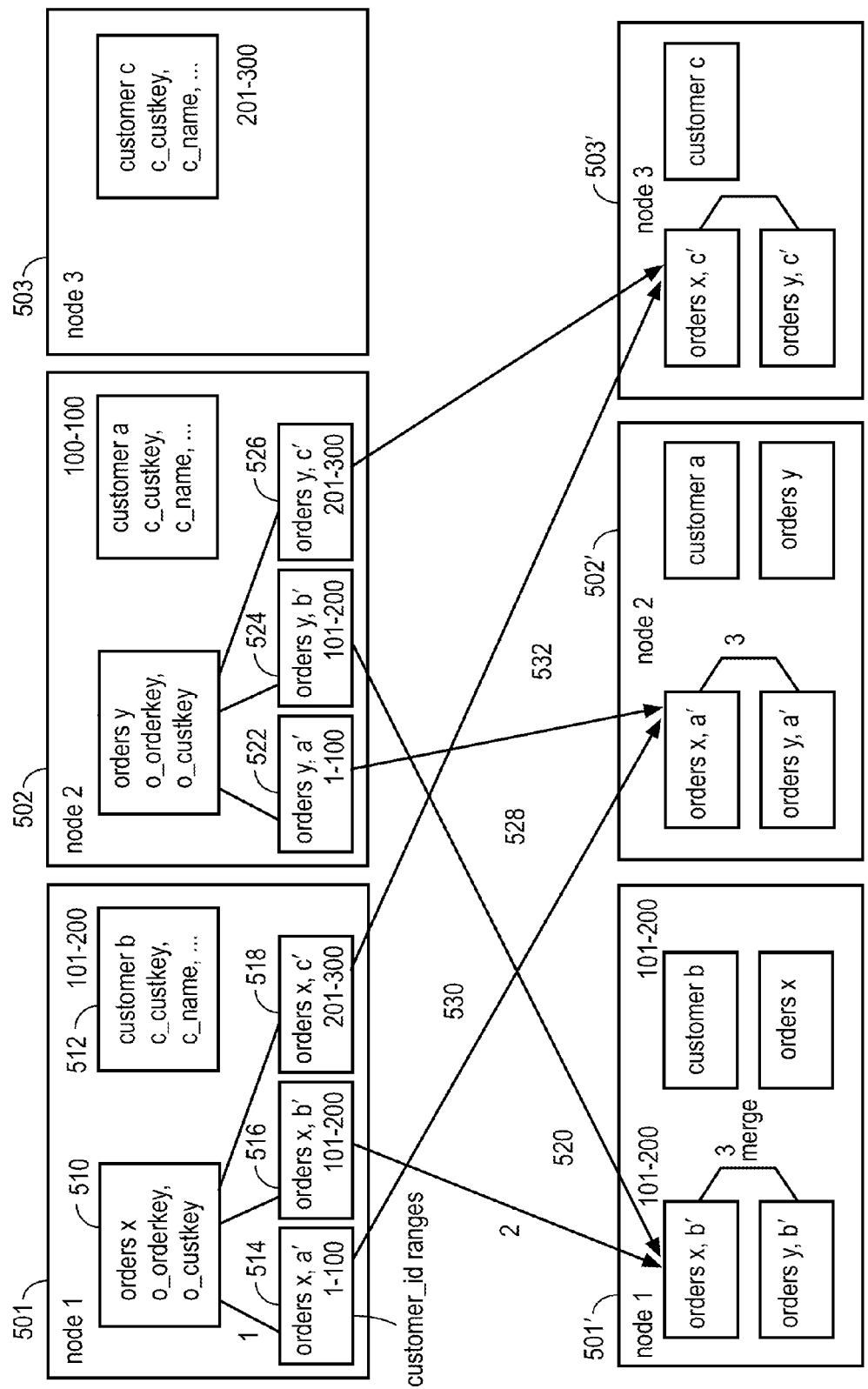
FIG. 5 illustrates reparation operations performed in accordance with an embodiment of the invention.

In the context of distributed join operations, broadcasting a table works well when the table is small. When larger tables need to be joined together, this approach runs into scaling problems. FIG. 5 shows a solution to the broadcast join problem using a single repartition join.

FIG. 5 illustrates a first worker node 501, a second worker node 502 and a third worker node 503. The orders table in this figure is partitioned across two worker nodes 501 and 502; and the customer table is partitioned across three worker nodes 501, 502, and 503. Worker node 501 has an orders X table partition 510 and a customer B table partition 512. In order to execute the single repartition join, the data in the orders X table partition 510 may be divided into customer id ranges 1-100, 101-200 and 201-300 respectively associated with customers a', b' and c', as shown in blocks 514, 516 and 518. The orders X, b' block 516 remains on the first node 501′, as shown with arrow 520. The orders Y table 522 of worker node 502 is also divided by the same customer id ranges to produce blocks 522, 524 and 526. The orders Y, b' block 524 is moved to node 501, as shown with arrow 528. Similarly, worker node 502′ receives orders X, a' block 514 from worker node 501, as shown with arrow 530, while keeping its orders Y, a' block 522, as shown with arrow 532. As a result, worker node 501′ has orders data for customer b, worker node 502′ has orders data for customer a and worker node 503′ has orders data for customer c.

It is worth noting that the single repartition join occurs over three stages. The first step involves splitting the underlying table data into specified intervals, in this example through range repartitioning. To execute this step, the database may choose to use a Map as its distributed execution primitive, or may map a Map execution primitive around a SQL execution primitive. After this stage, the repartitioned data needs to be shuffled across the network to their destination worker nodes. For this, the database may use a data fetching or pushing execution primitive. Finally, once the repartitioned data gets to the destination worker node, it needs to be merged together. To execute this last step, the database may use a Merge or Reduce execution primitive. Further, the database may further sort these repartitioned data.

The single repartition join described here avoids the problem associated with the broadcast join. In a broadcast join, all of the customer b data 512 from node 501 gets shuffled to workers nodes 502 and 503, all of the customer a data from worker node 502 gets shuffled to nodes 501 and 503 and all of the customer c data gets shuffled to nodes 501 and 502. The data shuffled with a broadcast join is O(Table Size)*O(Worker Node Count), which can become prohibitively expensive.

Finally, the idea behind single partition join could be extended to other join methods. In FIG. 5, the customer table is already range partitioned on the customer key column, and therefore, range repartitioning the orders table on the customer dimension is enough. In a different example, the customer table may be hash partitioned, and the orders table may need to be partitioned using a hash function. Or, the customer table might have been partitioned using the append method, where the minimum and maximum values for each shard have been stored, and it may be enough to range repartition the orders table. Further, one of the tables may have been partitioned on a composite key, where the composite key includes another table's partition column(s), so that the two tables are colocated on the same worker nodes across the cluster. Also, another scenario may have two tables partitioned on dimensions other than the ones that occur in a query's join clause. In that case, both tables may need to be repartitioned to perform the join. Two example join methods that are relevant to this scenario are the dual hash repartition join and the dual range repartition join methods.

Figures 4A, 4B:
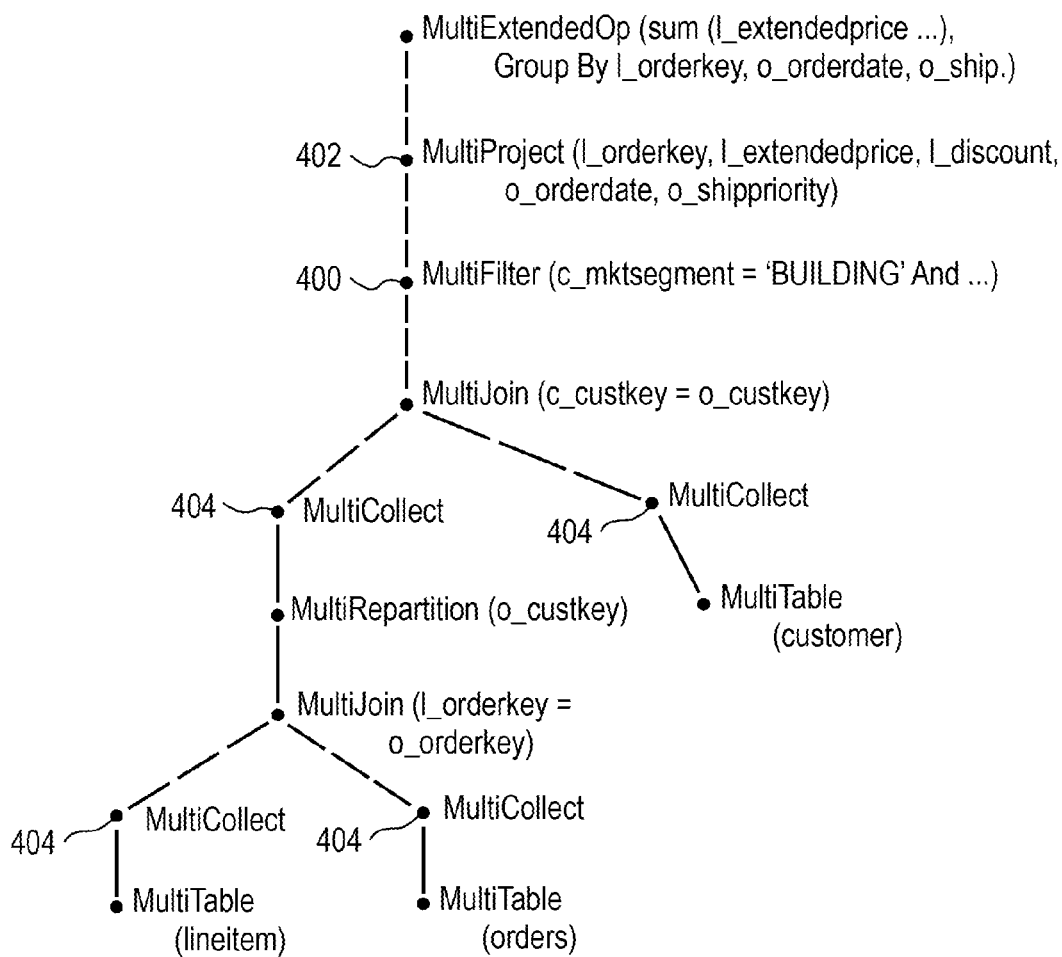
FIGS. 4A, 4B and 4C respectively illustrate a sample query, an original logical query execution plan and a modified logical query execution plan configured in accordance with an embodiment of the invention.

FIG. 4A illustrates a sample query for large table joins. FIG. 4B illustrates an initial logical query plan, while FIG. 4C illustrates a logical query plan optimized in accordance with operations of the invention.

The query of FIG. 4A joins together three large tables. In this diagram, in contrast to broadcast joins, the amount of data transfer is proportional to the table size. The first two tables "lineitem" and "orders" are already partitioned on the order key. Since they are partitioned on the same key, they can be joined without any data shuffling using a colocated join. In particular, first the lineitem and orders tables are joined through a colocated join. Then, the resulting tuples from this join are repartitioned on a different dimension, and are joined with the customer table in a single partition join. In one embodiment, a distributed relational operator reparations tuples of results that are at least 1 GB on a dimension and regroups the tuples on the dimension to avoid broadcasting the tuples between machines and thereby avoid consumption of network bandwidth.

The original query plan of FIG. 4B has multiple Multi-Collect data operations 404 relatively low in the logical query plan tree. These data collection operations correspond to shuffling large amounts of data across the network between worker nodes. In contrast, the optimized plan of FIG. 4C has a single MultiCollect operation 404′ at the top of the logical query plan tree (e.g., to recombine the customer id ranges). Further observe that the MultiFilter 400 and MultiProject 402 operations are relatively high in the logical query plan tree of FIG. 4B, while in the optimized version of FIG. 4C the MultiFilter 400′ and MultiProject 402 operations are relatively low in the logical query plan.

Figure 4C:
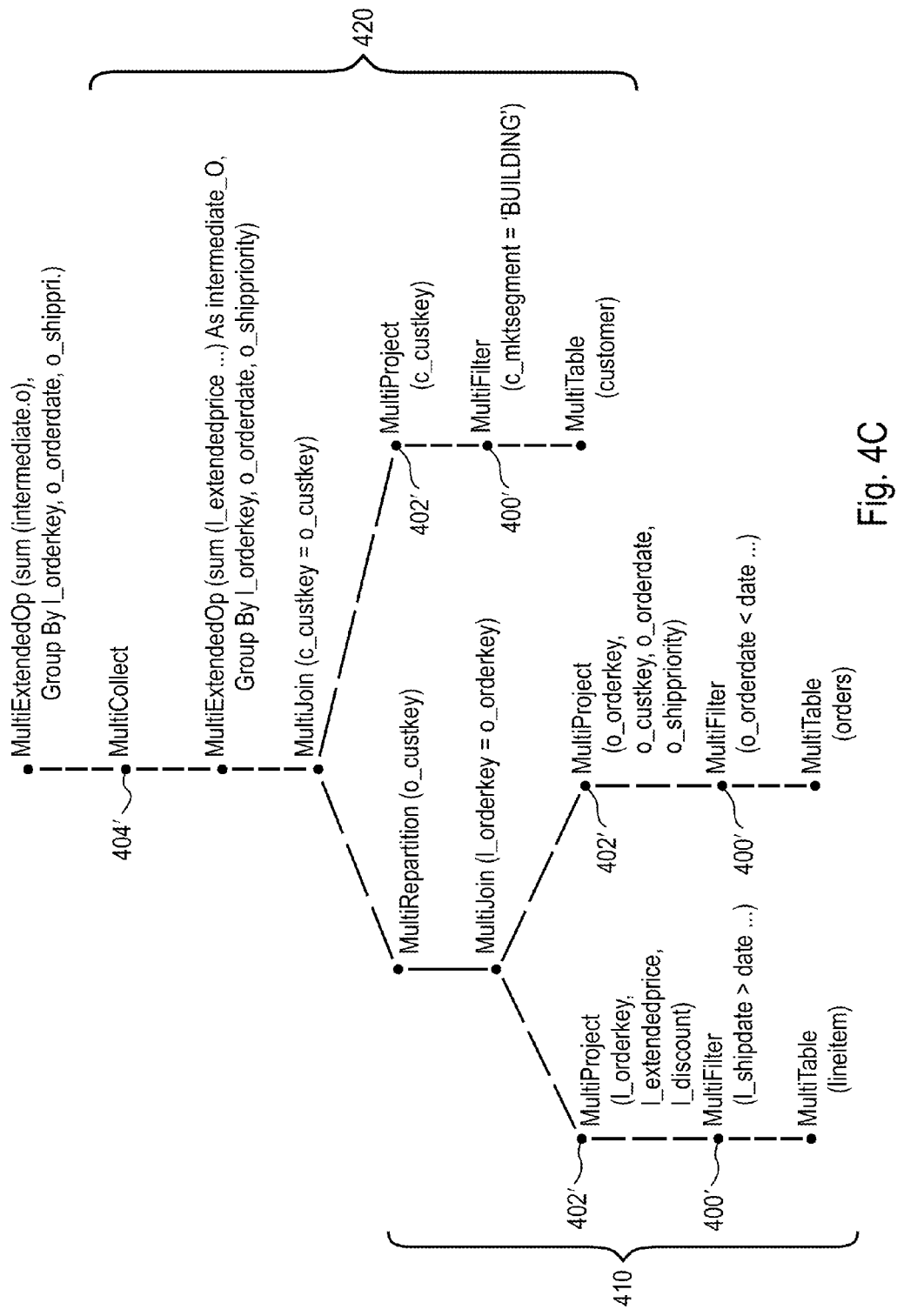
Figure 7:
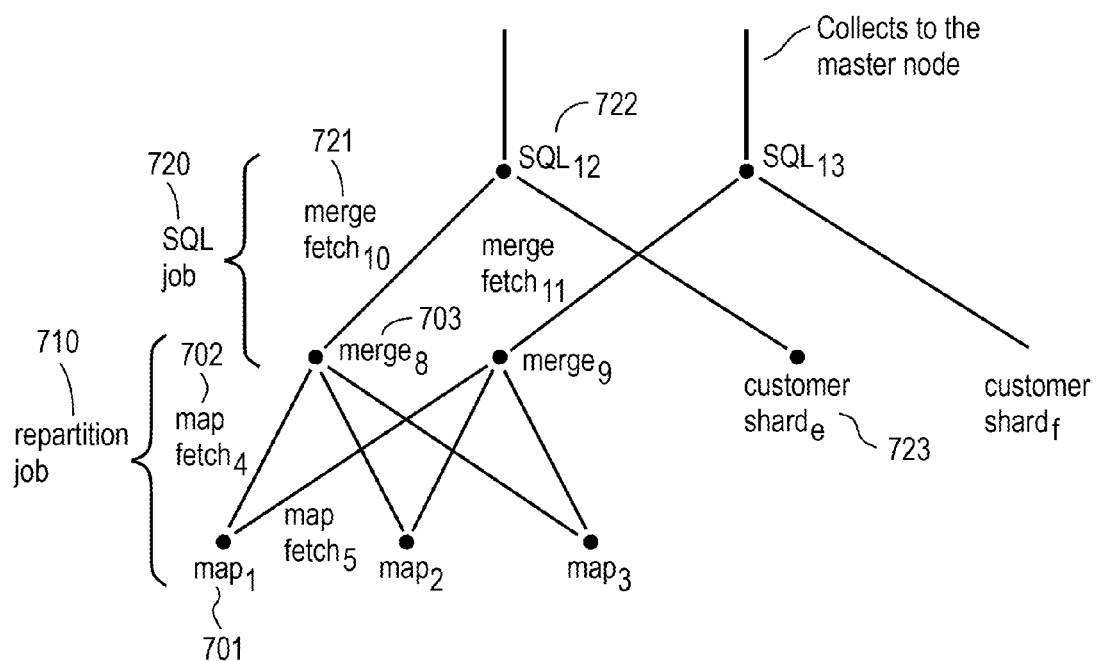
FIG. 7 is a physical query plan generated in accordance with an embodiment of the invention.

Once the query planner generates and optimizes the logical query plan in FIG. 4, the database may choose to directly map the query plan into distributed execution primitives. Alternately, the database may create a physical query plan to further enable network and disk I/O optimizations. FIG. 7 demonstrates an example physical query plan generated from the logical plan in FIG. 4C. In this figure, the left sub-tree 410 from FIG. 4C is mapped to the repartition job 710. This repartition job includes three types of tasks: Map tasks that split the input data into ranges or hash values, and thereby create intermediate data, MapFetch tasks that move intermediate data in between the worker nodes, and Merge tasks that merge intermediate data into their corresponding ranges or hash values. Also, map tasks may use grouping techniques besides range and hash values when splitting the input data. Further, map tasks, as well as other tasks that perform computations, may wrap themselves around SQL tasks.

For example, the map task 701 also performs a colocated join between a lineitem shard and an orders shard, where both shards correspond to the same interval of values. The map task 701 further executes applicable relational algebra operations, such as filtering and projection. The map fetch task 702 then moves one of the intermediate data groups generated by the map task 701 to another node. Last, the merge task 703 merges intermediate data groups transferred from different worker nodes into their corresponding group. This merge operation can be logical or physical.

In FIG. 7, the physical plan also includes a second job 720 that corresponds to the sub-tree 420 in FIG. 4C. This job 720 has two types of tasks: MergeFetch tasks to transfer merge results in between the worker nodes, and SQL tasks that apply relational algebra operators. In this example, the merge fetch task 721 moves the merge operation's results to the node that has the customer shard 723, and the SQL task 722 executes the generated SQL query. It is also worth noting that the physical planner may choose to colocate related tasks to the same worker node, leading to further optimizations. For example, the physical planner may ensure that the merge task 703, the customer shard 723, and the SQL task 722 are assigned to the same worker node. In this case, the merge task 703 may be pruned away from the physical query plan.

One of the most important problems in the field of databases relates to finding the best join strategy between tables in a given query. Most of this research has focused on finding the best order for local joins, and in the following we put emphasis on distributed table joins. We discuss heuristics, search algorithms, and cost-based algorithms; and show how they may help us in finding the ideal join strategy.

The term heuristic refers to experience-based methods for problem solving, learning, and discovery that give a solution, which is not guaranteed to be optimal. Where the exhaustive search is impractical, heuristic methods are used to speed up the process of finding a satisfactory solution via mental shortcuts to ease the cognitive load of making a decision.

In the context of calculating join strategies between distributed tables, heuristic based techniques could involve one or more of the following: choosing the starting condition for a join order, using educated guesses to estimate the network I/O costs associated with two equivalent but different join orders and then picking the cheaper order, or evaluating a set of rules in particular order to determine the ideal join strategy.

As an example, one heuristic may assume filter and project operators are pushed down a logical plan tree, and may use predefined constants for the amount of data filtered by pushing down these operators. The heuristic may then choose to join tables from largest to smallest based on the amount of data remaining after data filters are applied.

A second heuristic may use an ordered set of rules to pick the best join strategy. For example, this heuristic may consider broadcast join to be cheaper than a single repartition join. Therefore, when the next table needs to be selected to determine a join order, this heuristic may pick a table that only requires a broadcast join over one that requires a single repartition join.

Heuristic based techniques can also be combined together to produce better results. For example, the following algorithm uses different heuristics to pick a good join order for a statement that joins R tables:

1. The join planner generates a set of R join orders, each with a different table as the first table. The optimizer generates each potential join order using the algorithm:
   a. The first table is already fixed. To determine each subsequent element in the join order, the function then chooses the table that has the lowest ranking join rule, and with which it can join the table to the previous table in the join order. (Join rules include broadcast join, single repartition join, dual repartition join, and so forth. These rules are ranked according to our estimate of resulting network I/O.)

2. The join planner then chooses among the resulting set of join orders. The goal of the join planner's choice is to minimize the amount of network I/O performed. For this, the join planner relies on two heuristics:
   a. The function chooses join orders that have the fewest number of join operators that cause large data transfers. For this, the algorithm walks in reverse from the most expensive join rule (Cartesian product) to the cheapest one (broadcast join). For each rule type, we keep join orders that only contain the fewest number of join rules of that type.
   b. If there is a tie (after the previous filtering step), we pick candidate join orders where large data transfers happen at later stages of query execution.

Another class of algorithms defines a cost metric for the join strategy and aim to find join strategy that has the least cost. This cost may be defined as network or disk I/O. Given a cost metric, the join optimizer then tries to pick an order for the join of many relations. In doing this, the optimizer may consider all possible join orders or a subset of them.

Also, statistics about the underlying tables could be incorporated into the join optimizer so that the optimizer's cost estimates are more accurate. As an example, these statistics may include histograms that show data distributions for different columns.

An embodiment of the invention may use branch and bound enumeration. This approach begins by using heuristics to find a good physical plan for the entire logical query plan. Let the cost of this plan be C. Then, as we consider other plans for subqueries, we can eliminate any plan for a subquery that has a cost greater than C, since that plan for the subquery could not possibly participate in a plan for the complete query that is better than what we already know. Likewise, if we construct a plan for the complete query that has cost less than C, we replace C by the cost of this better plan in a subsequent exploration of the space of physical query plans.

An important advantage of this approach is that we can choose when to cut off the search and take the best plan found at that point. For instance, if the cost C is small, then even if there are much better plans to be found, the time spent finding them may exceed C, so it does not make sense to continue the search. However, if C is large, then investing time in the hope of finding a faster plan is wise.

Another embodiment of the invention may rely upon dynamic programming. Dynamic programming is a method for solving complex problems by breaking them down into simpler subproblems. It is applicable to problems exhibiting the properties of overlapping subproblems and optimal substructure. In this variation of the bottom-up strategy, we keep for each subexpression only the plan of least cost. As we work up the tree, we consider possible implementations of each node, assuming the best plan for each subexpression is also used.

Selinger-style optimization may also be used. This approach improves upon the dynamic programming approach by keeping for each subexpression not only the plan of least cost, but certain other plans that have higher cost, yet produce a result that is sorted or partitioned in an order that may be useful higher up in the expression tree.

A greedy algorithm may also be used. Even the carefully limited search of dynamic programming leads to a number of calculations that is exponential in the number of relations joined. It is reasonable to use an exhaustive method like dynamic programming or branch-and-bound search to find optimal join orders of five or six relations. However, when the number of joins grows beyond that, or if we choose not to invest the time necessary for an exhaustive search, then we can use a join-order heuristic in the query optimizer. The most common choice of heuristic is a greedy algorithm, where we make one decision at a time about the order of joins and never backtrack or reconsider decisions once made. We shall consider a greedy algorithm that only selects a left-deep tree. The greediness is based on the idea that one keeps the intermediate relations as small as possible at each level of the tree.

We form the basis of our induction by starting with the pair of relations whose estimated join size is smallest. The join of these relations becomes the current tree. We then continue our induction by finding, among all those relations not yet included in the current tree, the relation that, when joined with the current tree, yields the relation of smallest estimated size. The new current tree in the induction has the old current tree as its left argument and the selected relation as its right argument.

Partition pruning is an important performance feature for analytic databases. In partition pruning, the optimizer analyzes FROM and WHERE clauses in SQL queries to eliminate unneeded partitions when building the partition access list. This functionality enables the database to perform operations only on those shards that are relevant to the query.

Similarly, join pruning is an optimization that notably helps query performance. The optimizer examines different tables that are joined together, and eliminates joins between shards or repartitioned shards that would have generated empty results.

Distributed databases provide users with the capability of writing a query without knowing that the database is distributed. The user sees a global schema, which describes the logical structure of the database. The global database is partitioned into logical fragments (partitions or shards), which are then placed on different machines on the network. Similarly, the user's query is first mapped into a logical query plan, which takes into account the fact that the database is partitioned, but may not take into account the placement of shards across the worker nodes. The logical query plan may then be mapped into an intermediate physical query plan, or may directly be mapped into an execution strategy. The mapping to a physical query plan or an execution strategy may also introduce additional optimizations. For example, the query planner may first involve network I/O based optimizations, and the sub-queries generated after may further be optimized by the worker nodes to reduce disk I/O. Additionally, the worker nodes may apply optimizations specific to in-memory databases, Solid-state drives (SSDs), or hard disk drives. These optimizations may include resource control, lock optimization, cost-based query plan selection, and others.

It is also worth noting that the user's original query could be in any language that could be mapped into the described relational algebra operators. This language may be a Structured Query Language (SQL), another relational data model query language, a document database query language, an object relational query language, or a rule-based query language. The query language may also be declarative or procedural in its nature.

The partitioning of the underlying tables across machines in a cluster forms one of the differences between relational algebra and distributed relational algebra. As an example, consider a simple filter node that selects tuples with "l_shipdate>=date '2010-10-10'". In relational algebra, this operator runs on tuples from the underlying table, and filters those that don't match the given criteria. After filtering is done, the query is complete.

In distributed relational algebra, if the filter operator works on a distributed table's partitions before table data are collected in one location, the distributed filter operator runs on all partitions of a table. Each partition then generates a new intermediate relation that matches the defined selection criteria. In this case, after filtering is done, the query is still incomplete. Intermediate relations need to be collected first, merged, and then given to the user.

To extend on this example, assume that we have the same filter operator followed by a project operator that chooses columns l_extendedprice and l_discount from the results of the previous filter. In relational algebra, tuples are first filtered and then appropriate columns are projected. In distributed relational algebra, the filter operator runs on all partitions and generates an intermediate relation from each relation. The distributed project then works on each intermediate relation.

In distributed relational algebra, data or intermediate results need to be shuffled across the machines in the network. Therefore, relational algebra operators need to be extended to include data transfer operations. Two such distributed relational algebra operators are Collect and Repartition operators.

In relational algebra, data lives on a single machine. Therefore, relational algebra operators can directly run on the underlying data or results from other operators. In distributed relational algebra, executing the logical plan involves knowing where partitions or intermediate results are allocated (placed).

The information about these partition or intermediate result placements may be used in a physical query plan or an execution strategy for query optimization, scalability, and fault tolerance purposes. For example, one query planner may choose to assign tasks to distribute the query load evenly across the machines. A different query planner may choose to assign tasks to benefit from caching effects. Further, a query planner may assign multiple locations to a task so that the task may automatically be failed over to a different worker node in case of a failure. The query planner or executor may also determine that a group of tasks always needs to be failed over together, and may place them inside a constraint group. The query executor may also capture health and load statistics about the network and the worker nodes in a cluster, and may use this information to better allocate the generated tasks.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A database system, comprising:
a query planner with instructions executed by a processor to generate a logical plan tree, wherein each node of the logical plan tree is a distributed relational algebra operator, wherein at least one distributed relational algebra operator is a distributed extended relational algebra operator that represents at least one of an aggregation operator, a sorting operator and an extended projection and wherein each child node of the logical plan tree produces results processed by a parent node, wherein the logical plan tree includes a distributed relational operator that repartitions tuples of results that are at least 1 GB on a dimension and regroups the tuples on the dimension to avoid broadcasting the tuples between machines and thereby avoid consumption of network bandwidth associated with broadcasting the tuples,
wherein the logical plan tree is mapped to distributed query execution primitives, and wherein the distributed query execution primitives are processed on a plurality of machines storing partitions of a distributed database table,
wherein the aggregation operator is used by a grouping operator and applies one of sum, count, min, max and average functions, the sorting operator turns a relation into a list of tuples sorted according to one or more attributes and the extended projection performs computations involving columns of an argument relation to produce new columns; and
wherein the query planner has instructions executed by the processor to generate logical plan tree instances, including a first logical plan tree instance with the aggregation operator, a second logical plan tree instance with the sorting operator and a third logical plan tree instance with the extended projection.

2. The database system of claim 1 wherein the partitions of the distributed database table are modeled as modular blocks, wherein each machine holds a plurality of modular blocks.

3. The database system of claim 1 wherein the logical plan tree includes a collect node operative as a parent to collect tuples of results produced by a child node.

4. The database system of claim 3 wherein the collect node is moved up the logical plan tree when a parent operator of the collect node is unary and the collect node is commutative with the parent operator.

5. The database system of claim 3 wherein e collect node is moved up the logical plan tree when a parent operator of the collect node is binary and the collect node is factorizable with the parent operator.

6. The database system of claim 1 wherein the distributed relational algebra operator is selected from a filter node, a project node, a union node, a difference node, a join node, and a Cartesian product node.

7. The database system of claim 6 wherein the distributed relational algebra operator is moved down the logical plan tree when a child operator of the distributed relational algebra operator is unary and the distributed relational algebra operator is commutative with the child operator.

8. The database system claim 6 wherein the distributed relational algebra operator is moved down the logical plan tree when a children operator of the distributed relational algebra operator is binary and the distributed relational algebra operator is distributive with the children operator.

9. The database system of claim 1 wherein the distributed relational algebra operator is an extended node, wherein the extended node represents at least one of duplicate elimination, aggregate function, grouping of tuples, a sorting operator, and extended projection.

10. The database system of claim 9 wherein the extended node is split into a second node and a third node, wherein one of the second node or the third node is moved down the logical plan tree when a child operator is a collect node.

11. The database system of claim 1 wherein the query planner applies logical algebraic transformations to move nodes in the logical plan tree, wherein the logical algebraic transformations observe the commutativity, distributivity, idempower, or associativity properties of the distributed relational algebra operators.

12. The database system of claim 1 wherein the query planner includes a join strategy optimizer with instructions executed by a machine to estimate the network bandwidth for a plurality of alternate join strategies to produce network bandwidth estimates and to select a join strategy associated with the lowest network bandwidth estimate.

13. The database system of claim 12 wherein selecting a join strategy includes selecting a join method and a join order.

14. The database system of claim 13 wherein a join method is selected from a broadcast join, a colocated join, a single repartition join, a dual repartition join, and a Cartesian product join.

15. The database system of claim 12 wherein the join strategy optimizer uses statistics about underlying data of the distributed database table to estimate the network bandwidth for the plurality of alternate join strategies.

16. The database system of claim 15 wherein the statistics include at least one of sizes for the partitions of the distributed database table, minimum and maximum values of attributes in the partitions of the distributed database table, histograms on attributes in the partitions of the distributed database table, and random samples of the tuples in the partitions of the distributed database table.

17. The database system of claim 12 wherein the join strategy optimizer uses heuristic based techniques.

18. The database system of claim 12 wherein the join strategy optimizer uses cost based techniques.

19. The database system of claim 12 wherein the join strategy optimizer estimates the network bandwidth for the plurality of alternate join strategies using at least one of dynamic programming, Selinger-style dynamic programming, greedy search, and branch-and-bound search.

20. The database system of claim 1 wherein mapping the logical plan tree to distributed query execution primitives includes at least one of partition pruning and join pruning.

21. The database system of claim 1 wherein the distributed query execution primitives are modeled within a physical plan tree.

22. The database system of claim 21 wherein each subtree of the logical plan tree enclosed by a collect node or repartition node is represented as a job in the physical plan tree.

23. The database system of claim 21 wherein the job in the physical plan tree has a plurality of tasks, wherein each task is assigned to one or more machines.

24. The database of claim 1 wherein each distributed query execution primitive is selected from a SQL query, a data transmit function, a map function, and a merge function.

25. The database of claim 1 wherein results produced by a child node are fragmented across the plurality of machines to form result fragments, wherein each result fragment is assigned to one or more machines.

* * * * *